Patented Jan. 26, 1954

2,667,510

UNITED STATES PATENT OFFICE 2,667,510

CHEMICAL PROCESS FOR DIALKYL-ACYLAMIDES

William T. Dye, Jr., Dayton, Ohio, assignor, by mesne assignments, to The Chemstrand Corporation, a corporation of Delaware No Drawing. Application May 25, 1951, Serial No. 228,377

8 Claims. (Cl. 260—561)

The present invention is concerned with a chemical process for the production of dialkylacylamides.

It is an object of the invention to produce dialkylacylamides by a novel process which avoids the difficulties inherent in processes of the prior art. It is a specific object of the invention to prepare dimethylacetamide and higher dimethylacylamides. Other objects of the invention will become apparent hereinafter.

The methods heretofore employed in the manufacture of dialkylamides have been characterized by difficulties in the separation of the desired compounds from the reaction mixture. For example, J. R. Ruhoff and E. Emmett Reid, in an article entitled "A Series of Aliphatic Dimethyl Amides" in the Journal of the American Chemical Society, 59, 401 (1937), describe a process in which these compounds occur as azeotropic mixtures with acids. Such mixtures cannot be separated by ordinary distillation methods, so that the isolation of the dialkylamides requires the use of expensive chemical treating methods.

It has now been found that the difficulties of the prior art may be overcome by a process in which a tris(dialkylamido)phosphate is reacted with an aliphatic acid anhydride. The process of the present invention avoids the formation of interfering acid azeotropes, since no acids are present. As a result of this discovery substantially pure amides may be readily prepared.

The preparation of tris(dialkylamido)phosphates is described in copending application, Serial No. 28,723, filed May 22, 1948, and assigned to the same assignee as is the present application. The higher homologues of such phosphates may also be employed in the process of the present invention. The preparation of the starting compound is carried out as follows: The tris(dimethylamido)phosphate was prepared by reacting phosphoryl chloride, POCl₃, and dimethylamine in an inert solvent. In carrying out this reaction, 153 g. of phosphoryl chloride in 2 liters of toluene were treated at about 50° with dimethylamine until saturation was observed. The reaction mixture was then heated to 100° C. while bubbling in further dimethylamine until saturation. The solid material was filtered off and the solution heated to distil off the toluene. The crude product so obtained was washed with small amounts of a concentrated aqueous sodium hydroxide solution. Distillation of the crude product gave a yield of 116 g. of tris(dimethylamido)phosphate which was a clear, colorless liquid having a boiling point of 76° at 1 mm. pressure and a refractive index, $n_D^{25}=1.4570$. Instead of toluene, other solvents which are inert with respect to the phosphoryl chloride, may also be used, for example benzene, ethylbenzene, xylenes or mixtures thereof are suitable.

The process of the present invention is carried out by mixing together and reacting a tris(dialkylamido)phosphate in which the alkyl groups have from 1 to 2 carbon atoms with an aliphatic anhydride selected from the group consisting of acetic anhydride, propionic anhydride and butyric anhydride. The chemical reaction of the process of the invention is shown below, in which the preparation of dimethylacetamide is illustrated:

$$\underset{\underset{N(CH_3)_2}{|}}{\overset{N(CH_3)_2}{|}}{O=P-N(CH_3)_2} + (CH_3\overset{O}{\overset{\|}{C}})_2O \longrightarrow$$

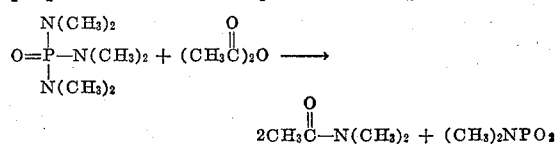

$$2CH_3\overset{O}{\overset{\|}{C}}-N(CH_3)_2 + (CH_3)_2NPO_2$$

Similar reactions are found to take place with the homologous tris(diethylamido)phosphate, and also with the higher aliphatic acid anhydrides.

Although the mechanism of the reaction is not completely understood, it would appear that the aliphatic acid anhydride first forms an intermediate compound with the tris(dialkylamido)phosphate, plus one molar proportion of the dialkylacylamide. Upon further heating, this intermediate compound decomposes to yield a second molar proportion of the dialkylacylamide. Thus, the present process employing the acid anhydride, rather than the acid per se, makes possible a doubling of the yield from a given quantity of tris(dialkylamido)phosphate.

The yields of dialkylacylamide are substantially quantitative.

The heating step does not require any critical temperature, but for convenience may be carried out near the boiling temperature of the dialkylacylamide either at atmospheric pressure or under vacuum so that the product may be withdrawn by distillation.

The following examples illustrate the general process and type of reaction with which the invention is concerned without, however, limiting the invention to the precise methods disclosed.

Example 1

A reaction vessel was charged with 0.3 moles (53.7 g.) of tris(dimethylamido)phosphate. The flask and contents were heated in an oil bath to a temperature of 155° C. and the gradual addition of 0.15 moles (15.3 g.) of acetic anhydride was begun. With the addition of the acetic anhydride the reaction, when once initiated, began to evolve heat, causing the reaction mixture to reach a temperature of 180° C. After the entire charge had been added, the reaction mixture was distilled, yielding 23 grams of a product having a refractive index, $n_D^{25}=1.4372$, which index corresponds to that of dimethylacetamide.

*Example 2*

The reaction of tris(dimethylamido)phosphate and acetic anhydride was conducted with 0.20 mole of the phosphate which was heated in a reaction vessel. Acetic anhydride (0.30 moles) was gradually added during the exothermic reaction. At the conclusion of the exothermic reaction the mixture was distilled and showed virtually complete reaction of the phosphate compound. The yield of dimethylacetamide amounted to 95% of the theory.

*Example 3*

The preparation of dimethylpropionamide was carried out by reacting 0.30 mole (53.7 g.) of tris-(dimethylamido)phosphate with propionic anhydride (0.40 mole, 52 g.) by heating the former compound to a temperature of 165° and slowly adding the latter compound while agitating the mixture. After the two reacting components had been added over a period of about one hour, the mixture was allowed to cool and was found to separate into two layers. The upper layer containing the crude product was first decanted from the nearly solid viscous lower layer. The upper layer was distilled yielding the dimethylpropionamide boiling at 65° at 13 mm. It had a refractive index, $n_D^{25}=1.4396$. The yield of the distilled product corresponded to 91% of theory.

*Example 4*

Diethylacetamide was prepared by heating 7.5 g. of tris(diethylamido)phosphate to 165° C. and then adding acetic anhydride (4.3 g.) very slowly. After the anhydride had all been added the mixture was heated at 160–165° for 2½ hours. The product was distilled to give the crude diethylacetamide which was then dedistilled to yield a product boiling at 60–65° at 0.6 mm. and having a refractive index, $n_D^{25}=1.4238$. The yield of diethylacetamide based upon the material reacted was very good.

I claim:

1. A process for producing dialkylacylamides which comprises heating under anhydrous conditions a reaction mixture consisting of equimolecular reaction proportions of a tris(dialkylamido)-phosphate in which the alkyl group contains from 1 to 2 carbon atoms and an aliphatic anhydride selected from the group consisting of acetic anhydride, propionic anhydride, and butyric anhydride, at a temperature approximately that of the boiling point of said dialkylacylamides, and thereafter continuing the heating of the reaction mass and recovering the dialkylacylamides.

2. The process as defined in claim 1 wherein the aliphatic anhydride is acetic anhydride.

3. The process as defined in claim 1 wherein the aliphatic anhydride is propionic anhydride.

4. The process as defined in claim 1 wherein the aliphatic anhydride is butyric anhydride.

5. A process for producing dimethylacylamides which comprises heating under anhydrous conditions a reaction mixture consisting of equimolecular reaction proportions of tris(dimethylamido)-phosphate and an aliphatic anhydride selected from the group consisting of acetic anhydride, propionic anhydride, and butyric anhydride, at a temperature approximately that of the boiling point of said dimethylacyclamides, and thereafter continuing the heating of the reaction mass and recovering the dimethylacylamides.

6. The process as defined in claim 5 wherein the aliphatic anhydride is acetic anhydride.

7. The process as defined in claim 5 wherein the aliphatic anhydride is propionic anhydride.

8. The process as defined in claim 5 wherein the aliphatic anhydride is butyric anhydride.

WILLIAM T. DYE, Jr.

References Cited in the file of this patent

UNITED STATES PATENTS

| Number | Name | Date |
|---|---|---|
| 2,160,841 | Dreyfus | June 6, 1939 |
| 2,160,842 | Dreyfus | June 6, 1939 |
| 2,603,660 | Heider | July 15, 1952 |